(12) United States Patent
Wolf et al.

(10) Patent No.: US 6,275,548 B1
(45) Date of Patent: Aug. 14, 2001

(54) TIMING RECOVERY SYSTEM

(75) Inventors: Tod D. Wolf; Alan Gatherer, both of Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/243,763

(22) Filed: Feb. 3, 1999

Related U.S. Application Data
(60) Provisional application No. 60/073,517, filed on Feb. 3, 1998, and provisional application No. 60/073,500, filed on Feb. 3, 1998.

(51) Int. Cl.[7] .................................................... H04L 7/00
(52) U.S. Cl. ........................ 375/355; 375/355; 375/376; 348/537
(58) Field of Search ................................ 375/261, 324, 375/355, 376; 348/537, 538; 329/304

(56) References Cited

U.S. PATENT DOCUMENTS 5,872,815 * 2/1999 Strolle et al. ........................ 375/321
6,148,037 * 11/2000 Abe ...................................... 375/321

* cited by examiner

*Primary Examiner*—Amanda T. Le
(74) *Attorney, Agent, or Firm*—Carlton H. Hoel; W. James Brady; Frederick J. Telecky, Jr.

(57) ABSTRACT

The preferred embodiments generalize the Band Edge Component Maximization (BECM) timing recovery method and provide blind timing recovery in Quadrature Amplitude Modulation (QAM) using all the available information rather than sampling the BECM output at the symbol rate.

3 Claims, 5 Drawing Sheets

TIMING RECOVERY SYSTEM

CROSS-REFERENCE TO RELATED APPLICATIONS

The present application claims priority from the following applications Nos. 60/073,517 and 60/073,500, both filed Feb. 3, 1998.

BACKGROUND OF THE INVENTION

The present invention relates to electronic circuits, and more particularly, to timing recovery circuits and methods.

In high speed modems for digital communication the timing recovery by the receiver synchronizes the symbol rate of the receiver to that of the transmitter. FIG. 1 shows an overall system with transmitter, receiver, converters and channel. The data rate over the channel for cable modems could be 20 MHz. The digital-to-analog and analog-to-digital converters could also run at the data rate. Because the transmitter and receiver are physically isolated from each other by the channel, their clocks could run at slightly different rates. A worst case rate difference could be on the order of 50 ppm. The channel could also introduce some phase errors into the signals and this needs to be corrected. The job of the timing recovery portion of the receiver is to correct both the phase errors and the frequency errors of the transmitter and receiver systems.

To correct for frequency errors, the digital timing recovery must be able to control the clocking of the receiver clock. If the transmitter clock is operating at the exact frequency of the receiver clock, then there is no error. But this is rarely the case. Usually, the two clocks will oscillate at slightly different frequencies. If the transmitter clock is slower than the receiver clock, then the receiver must be able to subtract a sample. And if the transmitter clock is faster than the receiver clock, then the receiver must be able to add a sample. The receiver typically samples the signal at a rate higher than the symbol rate. The timing recovery may perform these functions with an interpolator filter and some logic which generates a valid_out signal. The valid_out signal is nominally running at the sample rate which for cable modems is 20 MHz. If the timing recovery determines that it needs to add a sample or subtract a sample, then the output of the valid_out will look as illustrated in FIG. 2.

The timing recovery corrects phase errors by first determining the phase error of the channel. Next, it calculates the opposite of this phase which is used in the interpolator filter to cancel out the channel phase error. The output of the interpolator filter is the corrected samples to be used in the demodulator. The precision of the phase is related to the granularity of the interpolator coefficients. For a cable modem, typically the unit circle is divided into 128 slices with each slice corresponding to a (quantized) phase. The job of the timing recovery is to determine the phase error and pick one of the possible 128 sets of coefficients so that the interpolator filter can correct it.

One of the most popular timing recovery schemes in digital quadrature amplitude modulation (QAM) systems such as cable modems uses band edge component maximization (BECM). Godard originally proposed the BECM in 1978; see Godard, Passband Timing Recovery in an All-Digital Modem Receiver, 26 IEEE Tr. Comm. (May 1978). The BECM circuit produces timing phase estimates at the symbol rate, which are then passed to a loop filter.

U.S. Pat. No. 5,802,461 shows a variant of BECM applied to vestigial sideband modulation. The variant BECM output is filtered and the phase extracted to control a voltage controlled oscillator (VCO) which drives the analog-to-digital converter (ADC) sampling as illustrated in FIG. 3.

SUMMARY OF THE INVENTION

The present invention modifies the band edge component maximum (BECM) to generate timing phase estimates at the sample rate rather than the symbol rate, and a phase locked loop (PLL) averages the estimates and feeds back control at a low rate.

This has the advantage of increasing the speed of convergence and stability of the timing recovery loop.

DESCRIPTION OF THE PREFERRED EMBODIMENTS

Overview

Figure 1:
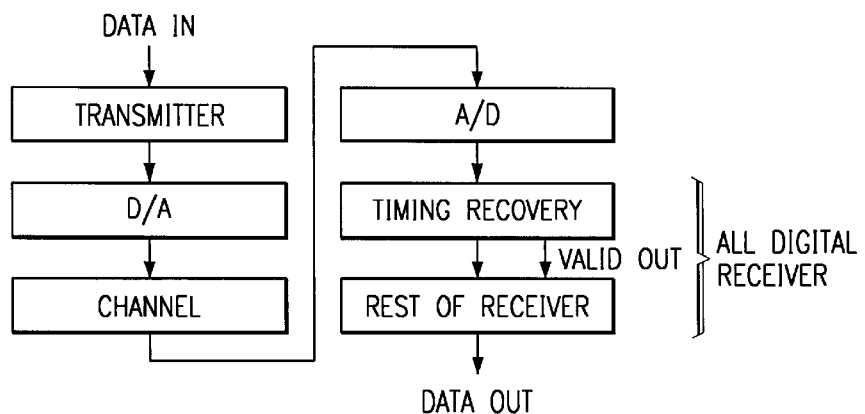
FIG. 1 shows a transmitter/receiver system.
Figure 2:
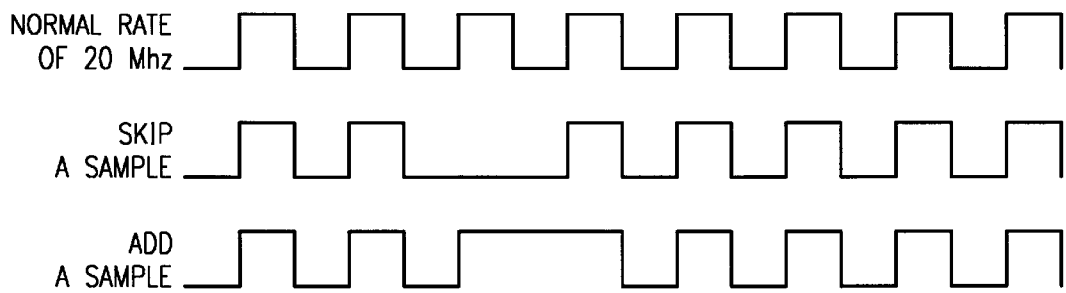
FIG. 2 is a timing diagram.
Figure 3:
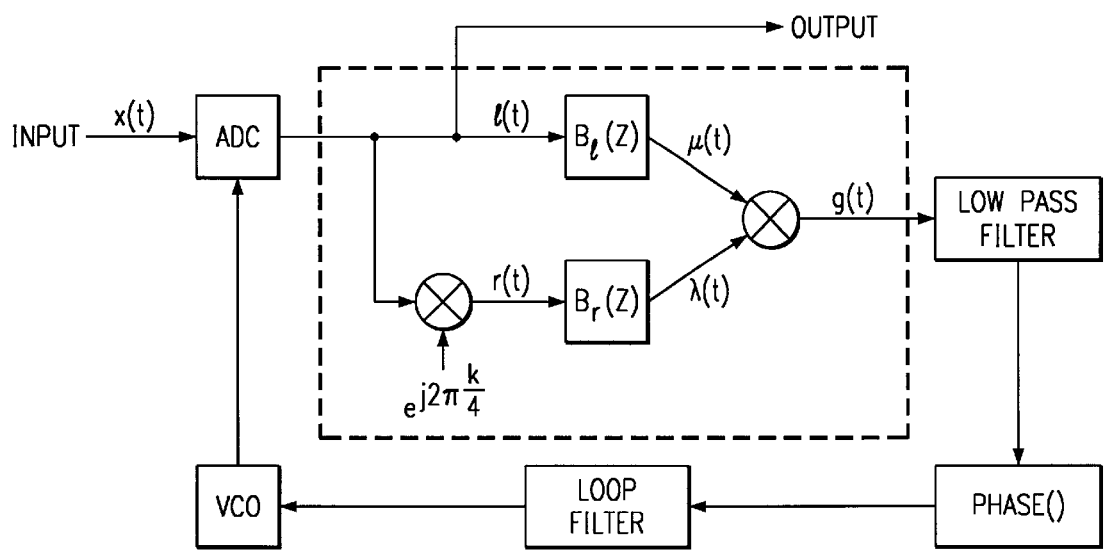
FIG. 3 illustrates a known variant BECM timing recovery in block format.
Figure 4:
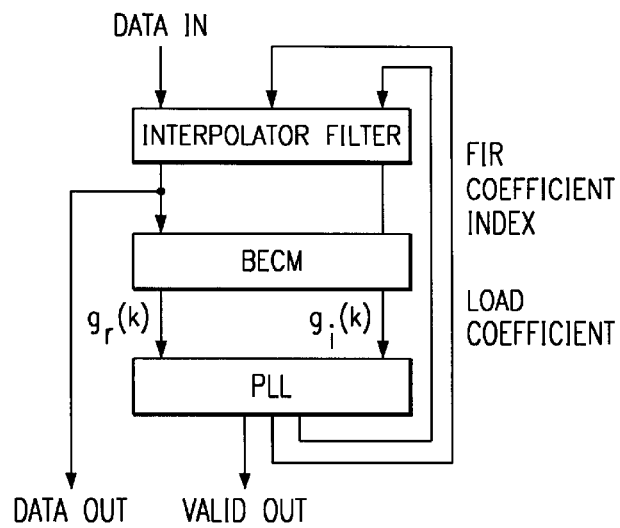
FIG. 4 shows a preferred embodiment timing recovery in block format.

FIG. 4 illustrates the blocks of a first preferred embodiment timing recovery system as including the following blocks: interpolator filter, band edge component maximization (BECM) block, and phase locked loop (PLL). The interpolator filter corrects the phase error. The interpolator uses a finite impulse response (FIR) filter and runs at the sample rate.

The BECM generates the real and imaginary signals $g_r(k)$ and $g_i(k)$ which are used to determine the real and imaginary averages within the PLL. The BECM runs at the sample rate. Running the BECM at the sample rate rather than the symbol rate allows faster convergence of the FIR filter coefficients.

The PLL determines the averages, the phase error, and the corrected FIR coefficient index. The PLL also controls the sequencing of the valid_out signal. The PLL runs at twice the sample rate. For a cable modem the smpling rate may be 20 MHz and twice or four times the symbol rate.

BECM

BECM is a method for extracting timing phase information directly from the passband signal without having to demodulate and decode the signal. It is therefore a blind timing recovery technique. A description of the theory behind BECM will provide a prelude to the preferred embodiments.

Figure 5:
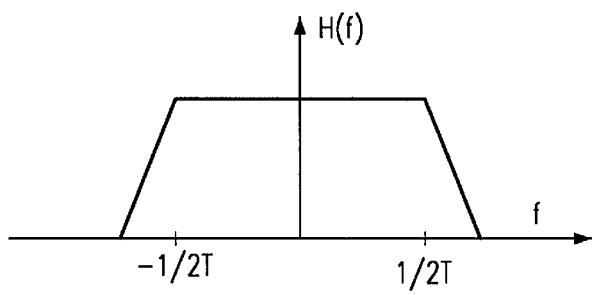
FIG. 5 illustrates QAM spectrum.

Quadrature amplitude modulation (QAM) receiver inputs can be described by their baseband equivalent. Indeed, the signal can be represented as $$s(t) = Re[x(t)e^{j2\pi f_c t}]$$

with $x(t)$ the baseband signal and $f_c$ the carrier frequency. The baseband signal is of the form $$x(t) = \sum_n a_n h(t - nT - \tau_s), \quad (1)$$

where $a_n$ is the $n^{th}$ input data symbol, T is the symbol period, h(t) is the complex pulse shape whose spectrum is the demodulated spectrum of the positive frequency part of the transmitter output signal, and $\tau_s$ is the timing phase error to be estimated. The complex baseband signal (and h(t)) might have a spectrum as illustrated in FIG. 5. The transmitted symbol rate is thus 1/T.

Figure 6:
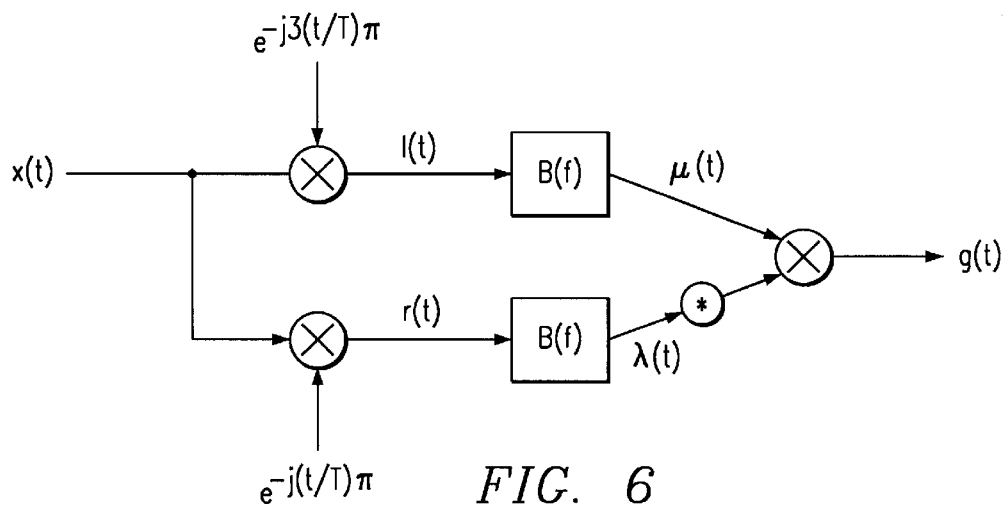
FIG. 6 shows generalized BECM.

The band edge components in BECM are produced by shifting the spectrum of the signal right and left so that each edge of the spectrum is at the origin, and then low pass filtering. For QAM this implies a shift of 1(2T) and 3/(2T) if we assume that the signal is initially modulated to 1/T as shown in the block diagram in FIG. 6 or shifts of ±1/(2T) for the unmodulated baseband signal. This produces the right hand component (RHC), r(t), and the left hand component (LHC), l(t). Low pass filtering produces the filtered RHC (FRHC), $\lambda(t)$, and filtered LHC (FLHC), $\mu(t)$. The BECM output is then $g(t)=\lambda(t)*\mu(t)$ where * denotes complex conjugate.

The effect of the frequency shift is to produce the RHC $$r(t) = \sum_n a_n h(t - nT - \tau_s) e^{j(t/T)\pi} \quad (2)$$

$$= \sum_n a_n e^{j\frac{\pi}{T}(nT+\tau_s)} h(t - nT - \tau_s) e^{j\frac{\pi}{T}(t-nT-\tau_s)}$$

$$= \sum_n a_n^{(r)} h_r(t - nT - \tau_s),$$

where $$a_n^{(r)} = a_n e^{j\frac{\pi}{T}(nT+\tau_s)}$$

is a rotated data vector and $$h_r(t) = h(t) e^{j\frac{\pi}{T}t}$$

is the modulated pulse shape. Similarly the LHC is $$l(t) = \sum_n a_n^{(l)} h_l(t - nT - \tau_s), \quad (3)$$

where $$a_n^{(l)} = a_n e^{-j\frac{\pi}{T}(nT+\tau_s)}$$

is a rotated data vector and $$h_l(t) = h(t) e^{-j\frac{\pi}{T}t}$$

is the modulated pulse shape.

Now assume the FRHC and FLHC are produced by low pass filtering with a filter B($f$) that has a very narrow bandwidth, giving the FRHC $$\lambda(t) = \sum_n a_n^{(r)} \int H(f_1 - 1/(2T)) B(f_1) e^{j2f_1\pi(t-nT-\tau_s)} df_1 \quad (4)$$

and the FLHC $$\mu(t) = \sum_m a_m^{(l)} \int H(f_2 + 1/(2T)) B(f_2) e^{j2f_2\pi(t-mT-\tau_s)} df_2. \quad (5)$$

If the data is independent and identically distributed (i.i.d.) and has zero mean, then $$E[a_n^{(r)*} a_m^{(l)}] = \delta(n-m) \xi_a e^{-j\frac{\tau_s}{T}2\pi}, \quad (6)$$

where $\xi_a = E[|a_n|^2]$ is the symbol power. The usual BECM output would then be $g(t)=\lambda(t)*\mu(t)$ and using Equations (4), (5) and (6) yields $$E[g(t)] = e^{-j\frac{\tau_s}{T}2\pi} \xi_a \int\int H(f_1 - 1/(2T))^* \quad (7)$$

$$H(f_2 + 1/(2T)) B(f_1)^*$$

$$B(f_2) e^{j2\pi(f_2-f_1)t} e^{j2\pi(f_1-f_2)\tau_s} \sum_n$$

$$(e^{-j2\pi((f_2-f_1)+1/T)nT}) df_1 df_2$$

Now as $\sum_n e^{-j2\pi \tilde{f} nT} = \frac{1}{T} \sum_k \delta(\tilde{f} - k/T)$ \quad (8)

the summation in Equation (7) is $$\sum_n e^{-j2\pi((f_2-f_1)+1/T)nT} = \frac{1}{T} \sum_k \delta((f_2 - f_1) + 1/T - k/T).$$

This is an infinite set of delta function edges in 2 dimensions that are evenly spaced according to the equation $$(f_2 - f_1) = -\frac{1}{T} - \frac{k}{T}.$$

Now as B($f$) is a narrow width low pass filter, the double integral in Equation (7) effectively only integrates close to $(f_1,f_2)=(0,0)$. There is only one delta function edge that passes through the origin and it obeys the equation $f_1=f_2$. Therefore the only significant delta function edge inside the double integral obeys the equation $$k=-1. \quad (9)$$

Using Equation (7), Equation (9) and the fact that the only significant delta function edge obeys $f_1=f_2$ gives $$E[g(t)] = e^{-j2\pi\frac{\tau_s}{T}} \frac{\xi_a}{T} \int H(f - 1/(2T))^* H(f + 1/(2T)) |B(f)|^2 df. \quad (10)$$

Hence, the mean of the output of the BECM block has phase that is linearly dependent on the timing phase error and independent of t provided the term in the integral in Equation (10) is not zero. The integral is nonzero because the QAM spectrum is centered around the origin and is non zero for a distance $(1+\alpha)/(2T)$ on either side of the origin, where a is a little greater than zero. Hence the FRHC and the FLHC come from the edges of the spectrum (that is the origin of the terminology "band edge components").

Note that there is no requirement that the samples of g(t) used to generate the estimate of the expectation are sampled at the symbol rate. Thus the preferred embodiments sample g(t) at the receiver sample rate to estimate the expectation. Once an estimate of the expectation has been generated by the PLL, the extracted phase is used to control the timing loop.

PLL

Traditionally, PLLs feed back timing error estimates at close to the symbol rate. The estimates are very noisy and the loop filter is employed to remove the noise. The preferred embodiment uses the more accurate estimate of the timing error (determined from the BECM input sample rate) and fed back at a lower rate. This avoids the problem of phase ambiguity that occurs when the timing phase error is large.

Figure 7:
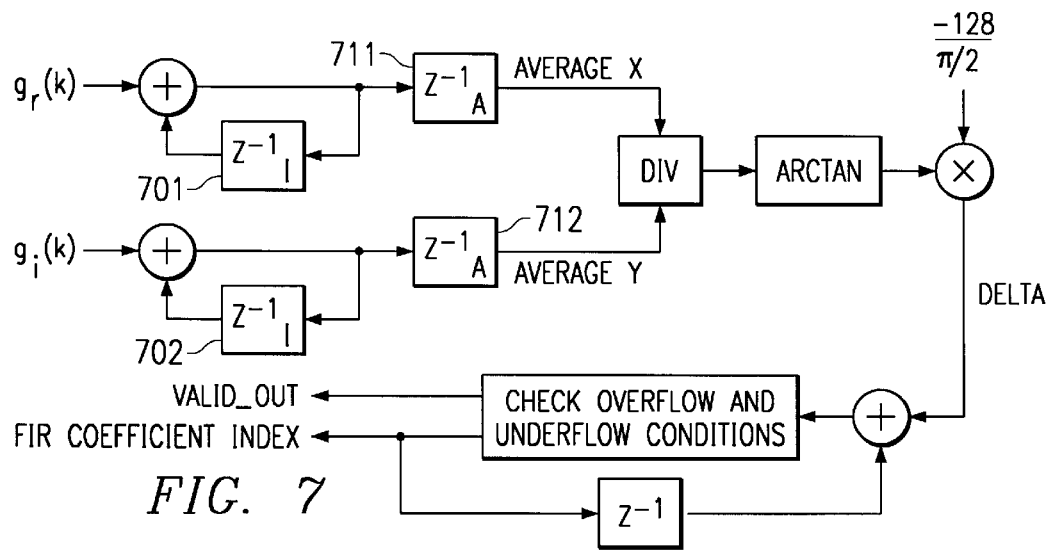
FIG. 7 is a schematic diagram of a PLL.

The PLL functions to determine phase error and determine the next FIR filter coefficient index to correct the phase error. The output of the BECM block has real and imaginary components which will generate averages X and Y. The PLL integrates the BECM outputs using the two registers 701–702 in FIG. 7 for 4,096 samples. A large number of samples are required because the output of the BECM is noisy. An incrementor and register are used to count the 4,096 samples. The count starts at 0 and continues until 4,095. At 4,095 registers 711–712 shown in FIG. 7 are loaded with the average X and average Y values. Also, registers 701–702 and the incrementor registers are reset to 0 at cycle 4,095. Once average X and average Y are found, the phase angle is found as the arctan of Y/X. Multiplication of this phase angle by a scale factor yields delta which is the difference between the current FIR coefficient index and the future coefficient index. That is, the new coefficient index equals the old index plus delta. If this sum is greater than 127, then a skip_a_sample occurrence has occurred and 128 is subtracted from the sum to constitute the new index and the valid_out signal goes inactive for one clock cycle. Conversely, if the sum is less than −127, then add_a_ sample occurrence has occurred and 128 is added to the sum to make the new index plus a valid_out signal goes active for one extra clock cycle.

Simulations

Figure 8:
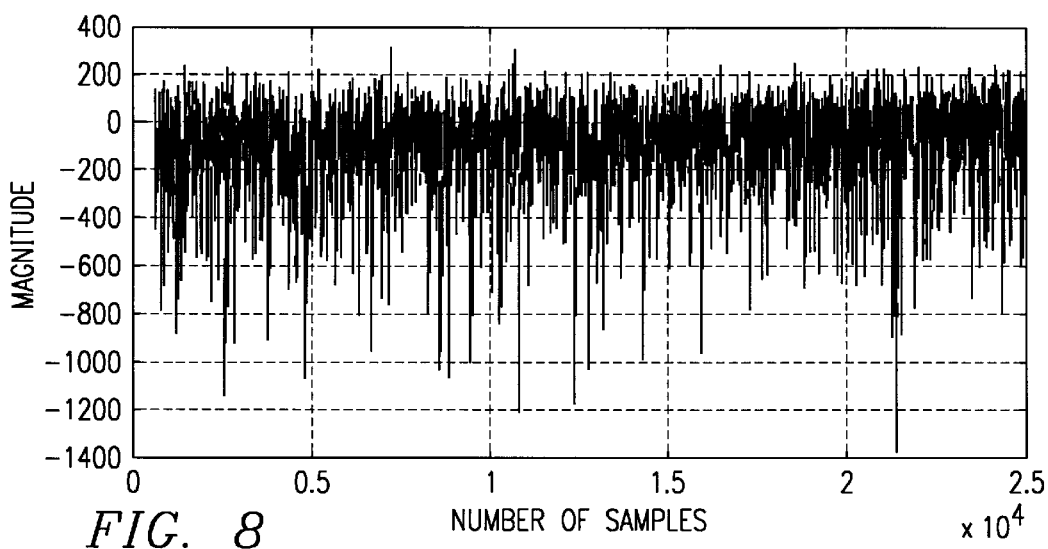
FIGS. 8–13 show simulation results.
Figure 9:
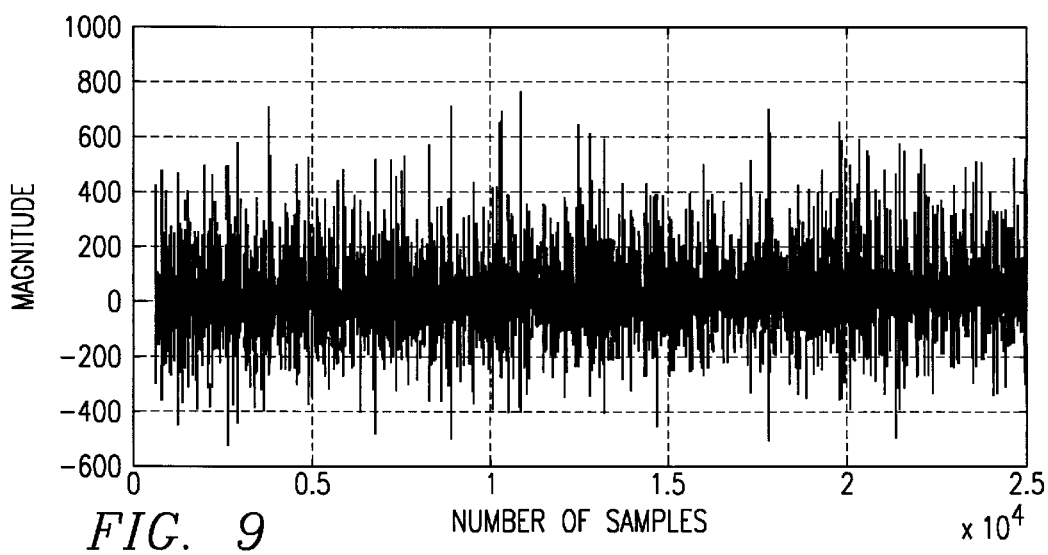
Figure 10:
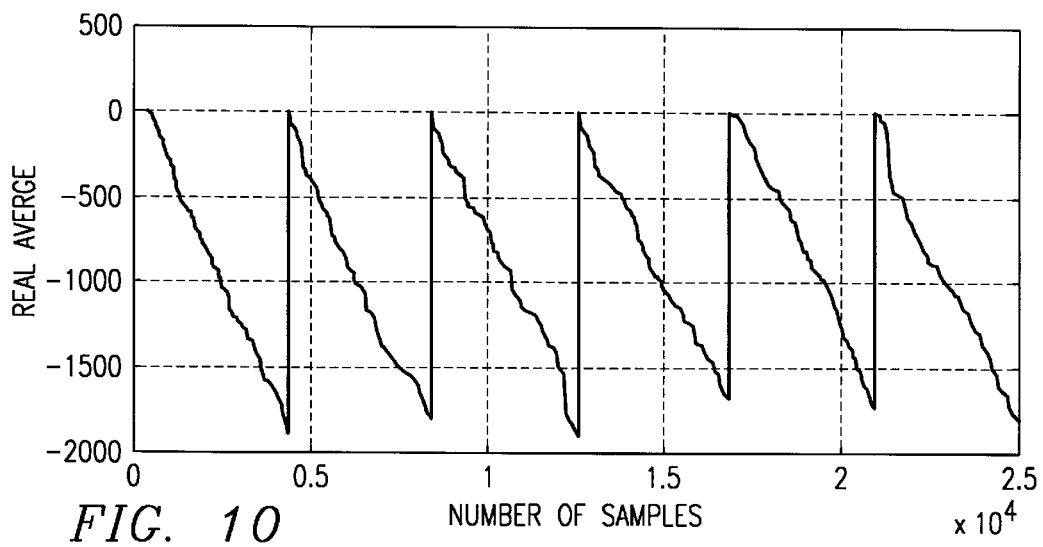
Figure 11:
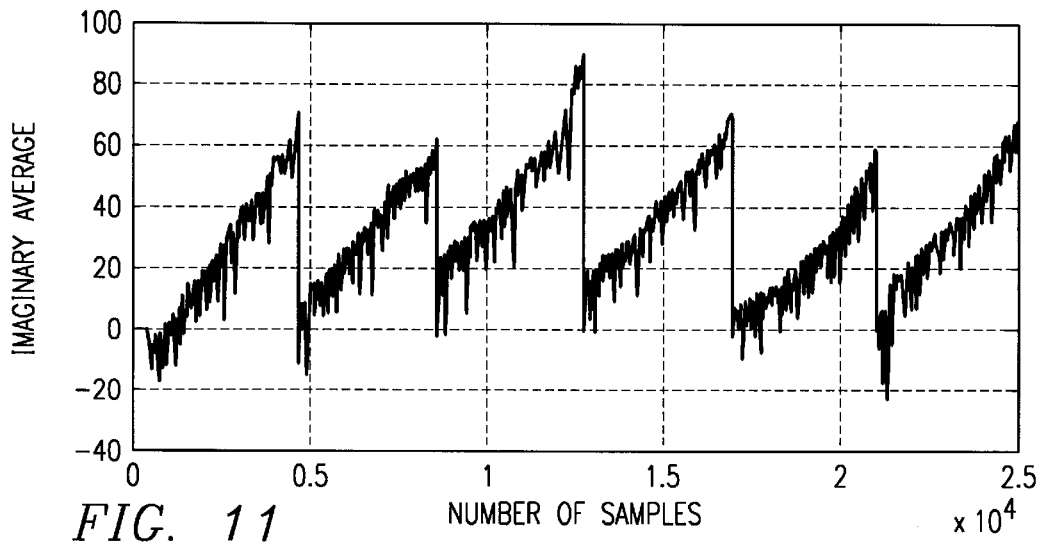
Figure 12:
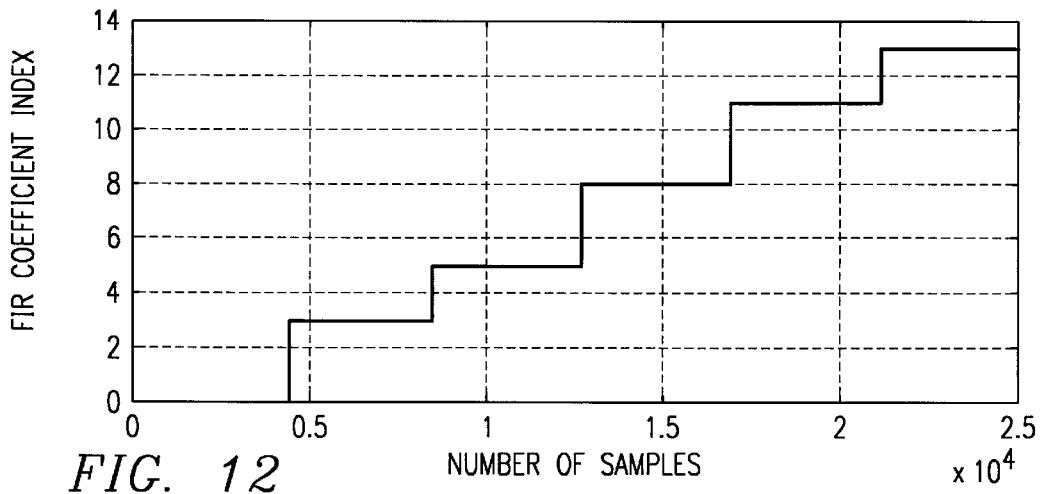

The following example will help clarify. Presume a channel with a receiver timing frequency error of $-5 \times 10^{-6}$ and a receiver timing phase error of −0.015625. Simulation real and imaginary BECM outputs are shown in FIG. 8 and FIG. 9. The signals are noisy and bounce around. The average for the real and the imaginary components are −113.6 and 3.83, respectively. Allowing the PLL to integrate over a discrete number of samples gives an average for both components. The real average accumulation is shown in FIG. 10 and the imaginary is shown in FIG. 11 as functions of the number of samples. The more samples used gives a better average but also reduces the response of the timing recovery system. After testing, 4,096 samples was chosen as the integration period; this worked well for frequency errors of 20 ppm and less. A variant preferred embodiment adds some logic to adjust the integration period depending upon the error rate. For example, 4,096 samples could be used for error rates on the order of 10 ppm, but 1,024 samples used for error rates on the order of 100 ppm. FIG. 12 shows the FIR coefficient index changing for a frequency error of $-5 \times 10^{-6}$. The plot shows that the index is changing by 2 or 3 units for each discrete average over 4,096 points.

To verify Equation (10) use a QAM signal modulated to 1/T and sampled at rate 4/T. The BECM circuit is as in FIG. 6 with t=kT/4.

To keep the design simple, single pole IIR filters were used for with $$B(z) = \frac{1}{1 + 0.95 z^{-1}}. \quad (11)$$

Note that the input to the filter is complex so it can be realized by two real filters, one filtering the real part of the input and one filtering the complex part.

Figure 13:
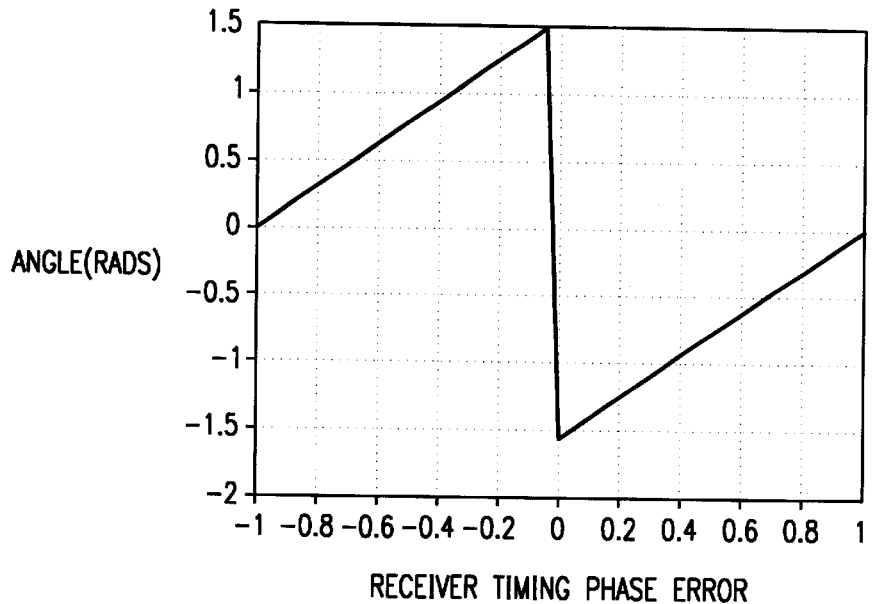

Applying different timing phase errors to the input of the BECM block yielded the results as in FIG. 13 showing the phase of the average output. This shows a strong linear relationship between the output phase and the actual timing phase error. This relationship allows the recovery of timing frequency errors.

Implementation

The simulation of the BECM's C model was verified using SPW. Next, each variable in the C model was modified to use a fixpoint size. The simulation of the fixpoint sizes were also verified in SPW. Next, the VHDL was written to match the C models fixpoint sizes. The VHDL's test vectors were generated from the SPW's test vectors using a simple translation program. These vectors were used to verify the simulation of the VHDL models using Synopsys's VSS. Finally, the design was synthesized into TI's TSC4000 ASIC library using Synopsys's Design Compiler tool. The TSC4000 library is a 0.35 $\mu$m library.

Figure 14:
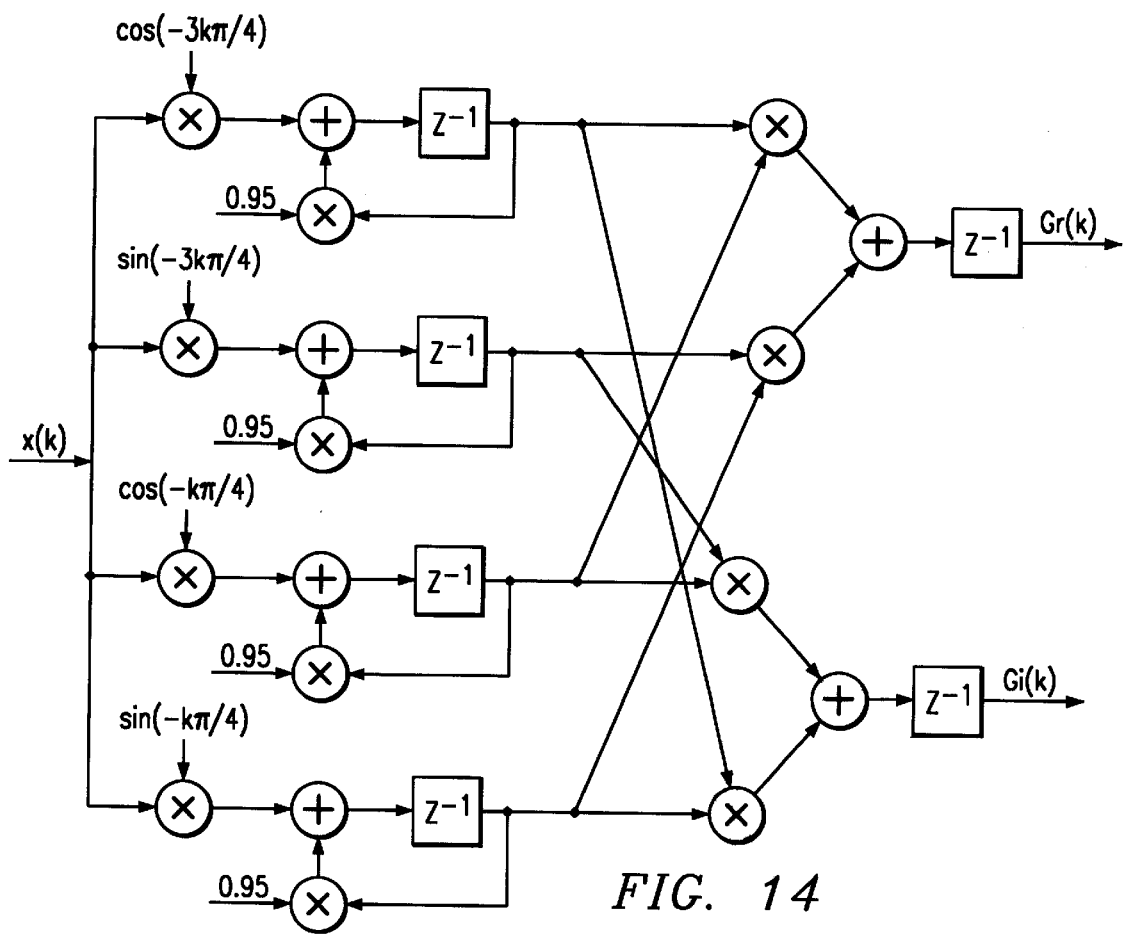
FIG. 14 is a schematic diagram of a BECM block.

The circuit of FIG. 14 was designed for a 20 MHz clock. The design took 7930 gates. The first pipeline has a worst case delay of 23.53 ns and the second pipeline has a worst case delay of 27.45 ns. The cos and sin multipliers complete a complete cycle in 8 iterations. The values for the multipliers for each value of k are shown in the following table:

| k | $\cos(-\pi 3k/4)$ | $\sin(-\pi 3k/4)$ | $\cos(-\pi k/4)$ | $\sin(-\pi k/4)$ |
|---|---|---|---|---|
| 0 | 1 | 0 | 1 | 0 |
| 1 | $-\sqrt{2}/2$ | $-\sqrt{2}/2$ | $\sqrt{2}/2$ | $-\sqrt{2}/2$ |
| 2 | 0 | 1 | 0 | −1 |
| 3 | $\sqrt{2}/2$ | $-\sqrt{2}/2$ | $-\sqrt{2}/2$ | $-\sqrt{2}/2$ |
| 4 | −1 | 0 | −1 | 0 |
| 5 | $\sqrt{2}/2$ | $\sqrt{2}/2$ | $-\sqrt{2}/2$ | $\sqrt{2}/2$ |
| 6 | 0 | −1 | 0 | 1 |
| 7 | $-\sqrt{2}/2$ | $\sqrt{2}/2$ | $\sqrt{2}/2$ | $\sqrt{2}/2$ |

Similarly, the PLL of FIG. 7 was simulated using BHDL models. After successful simulation the models were synthesized into TI's TSC4000 ASIC library. The design took 4,088 gates and had a worst case delay of 47.5 nsec.

What is claimed is:

1. A timing recovery method, comprising the steps of:
   (a) sampling an input signal at a sample rate, said signal with quadrature amplitude modulation, said sampling at a rate higher than the symbol rate of said input signal;
   (b) filtering said sampled signal to yield a left band edge sampled signal and a right band edge sampled signal;
   (c) combining said left band edge signal and said right band edge signal to form a complex sampled signal;
   (d) controlling said sampling by said complex sampled signal.

2. The method of claim 1, wherein:
   (a) said controlling includes (i) forming an average of the imaginary component of said complex sampled signal over N samples with N a positive integer, (ii) forming an average of the real component of said complex sampled signal over N samples, and (iii) estimating a phase from the ratio of said average.

3. The method of claim 1, wherein:
   (a) said N is adjusted according to the difference of said sampling rate and said symbol rate.

* * * * *